United States Patent [19]

Pater

[11] Patent Number: 5,306,784

[45] Date of Patent: Apr. 26, 1994

[54] TOUGH, PROCESSABLE SEMI-INTERPENETRATING POLYMER NETWORKS FROM MONOMER REACTANTS

[75] Inventor: Ruth H. Pater, Tabb, Va.

[73] Assignee: The United States of America as represented by the administrator of the National Aeronautics and Space Administration, Washington, D.C.

[21] Appl. No.: 831,763

[22] Filed: Jan. 31, 1992

Related U.S. Application Data

[63] Continuation-in-part of Ser. No. 430,470, Nov. 2, 1989, abandoned.

[51] Int. Cl.$^5$ .......................... C08J 5/08; C08G 73/00
[52] U.S. Cl. ..................... 525/421; 525/432; 525/436; 525/903; 428/473.5
[58] Field of Search ............... 525/432, 436, 903, 421

[56] References Cited

U.S. PATENT DOCUMENTS

| | | | |
|---|---|---|---|
| 4,954,578 | 9/1990 | Ree et al. | 525/432 |
| 4,996,101 | 2/1991 | Landis et al. | 428/272 |
| 5,145,916 | 9/1992 | Yamamoto et al. | 525/421 |
| 5,149,246 | 9/1992 | Pater | 525/422 |
| 5,159,029 | 10/1992 | Pater et al. | 525/421 |

Primary Examiner—Ana L. Carrillo
Attorney, Agent, or Firm—George F. Helfrich

[57] ABSTRACT

A high temperature semi-interpenetrating polymer network (semi-IPN) was developed which had significantly improved processability, damage tolerance and mechanical performance, when compared to the commercial Thermid ® materials. This simultaneous semi-IPN was prepared by mixing the monomer precursors of Thermid ® AL-600 (a thermoset) and NR-150B2 (a thermoplastic) and allowing the monomers to react randomly upon heating. This reaction occurs at a rate which decreases the flow and broadens the processing window. Upon heating at a higher temperature, there is an increase in flow. Because of the improved flow properties, broadened processing window and enhanced toughness, high strength polymer matrix composites, adhesives and molded articles can now be prepared from the acetylene end-capped polyimides which were previously inherently brittle and difficult to process.

10 Claims, 4 Drawing Sheets

TOUGH, PROCESSABLE SEMI-INTERPENETRATING POLYMER NETWORKS FROM MONOMER REACTANTS

ORIGIN OF THE INVENTION

The invention described herein was made by an employee of the United States Government and may be manufactured and used by or for the Government for governmental purposes without the payment of any royalties thereon or therefor.

CROSS-REFERENCE

This application is a continuation-in-part of co-pending application Ser. No. 430,470, filed Nov. 2, 1989 now abandoned and is related to co-pending patent application Ser. No. 429,514, filed Oct. 31, 1989 now U.S. Pat. No. 5,159,029, entitled A Tough High Performance Composite Matrix, and Ser. No. 301,925, filed Jan. 26, 1989 now U.S. Pat. No. 5,149,746, entitled Semi-Interpenetrating Polymer Network for Tougher and More Microcracking Resistant High Temperature Polymers.

BACKGROUND OF THE INVENTION

1. Field of the Invention

The present invention relates generally to high temperature polymers. It relates particularly to a semi-interpenetrating polymer network approach to the obtainment of more processable, tougher and more moisture resistant high temperature polymers. The systems are particularly adapted to use as moldings, adhesives and composite matrices.

2. Description of the Related Art

There is a continual search in the art for more processable and damage tolerant high temperature polymers for use as moldings, adhesives and composite matrices in aerospace and electronic technologies. Materials used in these environments must have a variety of desired properties including easy processing, good damage tolerance, a high glass transition temperature, good mechanical performance, capable of withstanding high temperature, low moisture absorption, and resistance to a variety of organic solvents. Although polymers exist that exhibit one or more of the above properties, these materials are generally deficient in at least one other desired property.

One example of such material is the thermoplastic polyimide, NR-150B2, which is commercially available from E.I. Dupont de Nemours and Company (Dupont). This material is well known for its good toughness and microcracking resistance. In addition, it has unusually high thermo-oxidative stability. Unfortunately, it is difficult to process and it requires processing temperatures as high as 400° C.

Another example includes the commercially available Thermid ® materials, which are commercially available from the National Starch and Chemical Corporation. These materials are acetylene-endcapped polyimides. They offer outstanding thermo-oxidative stability, exceptional dielectric properties and excellent resistance to humidity at elevated temperature. However, these materials are inherently brittle due to their highly crosslinked structures and are liable to microcrack in their composites when subjected to thermal cycling. Also, despite having the advantage of addition-curing, they are actually very difficult to process. This is primarily due to their very narrow processing window. Thermid ® MC-600, for example, has a gel time of three minutes at 190° C. (A. L. Landis and A. B. Naselow, NASA Conference Publication 2385 (1985)). The problem becomes exacerbated in composite fabrication, particularly in large and/or complex composite parts. Because of the processing difficulty, the composite property values for Thermid ® MC-600 are lower than expected. The National Starch and Chemical Corporation product data sheet number 26283 reports the values of 195 and 148 ksi for the unidirectional flexural strengths tested at 25° C. and 316° C., respectively, and interlaminar shear strengths of 12 and 8 ksi at 25° C. and 316° C., respectively. The desired values are 250 and 150 ksi for the 25° C. and 316° C. flexural strengths and 14 and 8 ksi for the 25° C. and 316° C. interlaminar shear strengths.

This processing problem was well recognized in the early stages of the material's development. Several approaches have been attempted to improve the processability of Thermid ® MC-600. The first approach was to incorporate difunctional or monofunctional acetylene-terminated reactive diluents into the material (A. L. Landis and A. B. Naselow NASA Conference Publication 2385 (1985)). This approach had limited success due to the lack of a common solubility between the preimidized oligomer and the diluent.

Grimes and Reinhart (U.S. Pat. No. 4,365,034) took another approach, recognizing that the processing problem was related to the fast cure rate of the acetylene-terminated material. They added a chemical inhibitor to retard the rate of cure so that the oligomer remains in the fluid state for an extended period of time thereby increasing the processing window. Some examples of this inhibitor include hydroquinone, maleic acid, glutaric acid, or bis($\beta$-naphthyl)para-phenylene diamine. However, whether such an approach indeed facilitates the fabrication of high quality composite materials was not demonstrated.

To improve the resin flow, Landis and Naselow (NASA Conference Publication 2385 (1985)) developed an isoamide version of Thermid ® MC-600, which is now known as Thermid ® IP-600. Despite the markedly improved resin flow, the resulting composite showed relatively low levels of mechanical properties (unidirectional flexural strengths of 130 and 78 ksi at 25° C. and 288° C. and interlaminar shear strengths of 7 and 5 ksi at 25° C. and 288° C., respectively).

Recently, Landis and Lau (U.S. Pat. No. 4,996,101) extended the isoamide modification concept to the development of a semi-interpenetrating polymer network (semi-IPN). They prepared a sequential semi-2-IPN by combining a thermoplastic polyisoimide with a thermosetting imide or isoamide oligomer which contains an acetylene-terminated group. They assert that the isoamide modification can, by theory, improve the composite processing and thereby produce better quality composite materials than the present state-of-the-art materials. Unfortunately, they did not demonstrate the improved composite properties for these semi-2-IPNs. The absence of a showing of the composite mechanical properties makes the utility of this technology questionable. It is doubtful that the isoamide modification can, in practice, significantly improve the processability. The reason is as follows: the isoamide undergoes an isoimide-imide isomerization. This isomerization reaction induces a melt-flow transition which is responsible for the improved resin flow. However, the isomerization reaction takes place rapidly and occurs at a relatively low temperature. Thermid® IP-600, for example, shows a sharp melt-flow transition peak at 148° C. in the Rheometrics® rheology-temperature curve. This is illustrated in FIG. 1. This transition is due to the isoamide-imide isomerization. This interpretation is supported by the appearance of another transition peak occurring at 188° C. due to the melt-flow of the imide formed from the isoamide. Thermid® MC-600 has the same transition peak at 188° C. The cure temperature for Thermid® based composites is usually 250° C. At this critical cure temperature, Thermid® IP-600 has already gelled, the gel temperature being 220° C. Thus, the enhanced flow resulting from the isoamide modification will not significantly affect the composite fabrication. This may explain why low values were obtained for the composite mechanical properties formed from Thermid® IP-600.

Egli and St. Clair (U.S. Pat. No. 4,695,610) have also prepared chemically compatible semi-2-IPNs from thermoplastic polyimide sulfones and thermosetting acetylene-endcapped polyimide sulfones. However, none of these prior art products have the desired combination of properties set forth herein above.

It is believed that the processing difficulty of the Thermid® materials is directly related to the fundamental nature of the curing chemistry. According to the proposed cure mechanism (Goldfarb, Lee, Arnold, and Helminiak, NASA CP 2385 (1985)) the curing of an acetylene-terminated oligomer proceeds stepwise and can be broadly divided into two distinct stages. The reaction sequence is shown by the following reaction scheme.

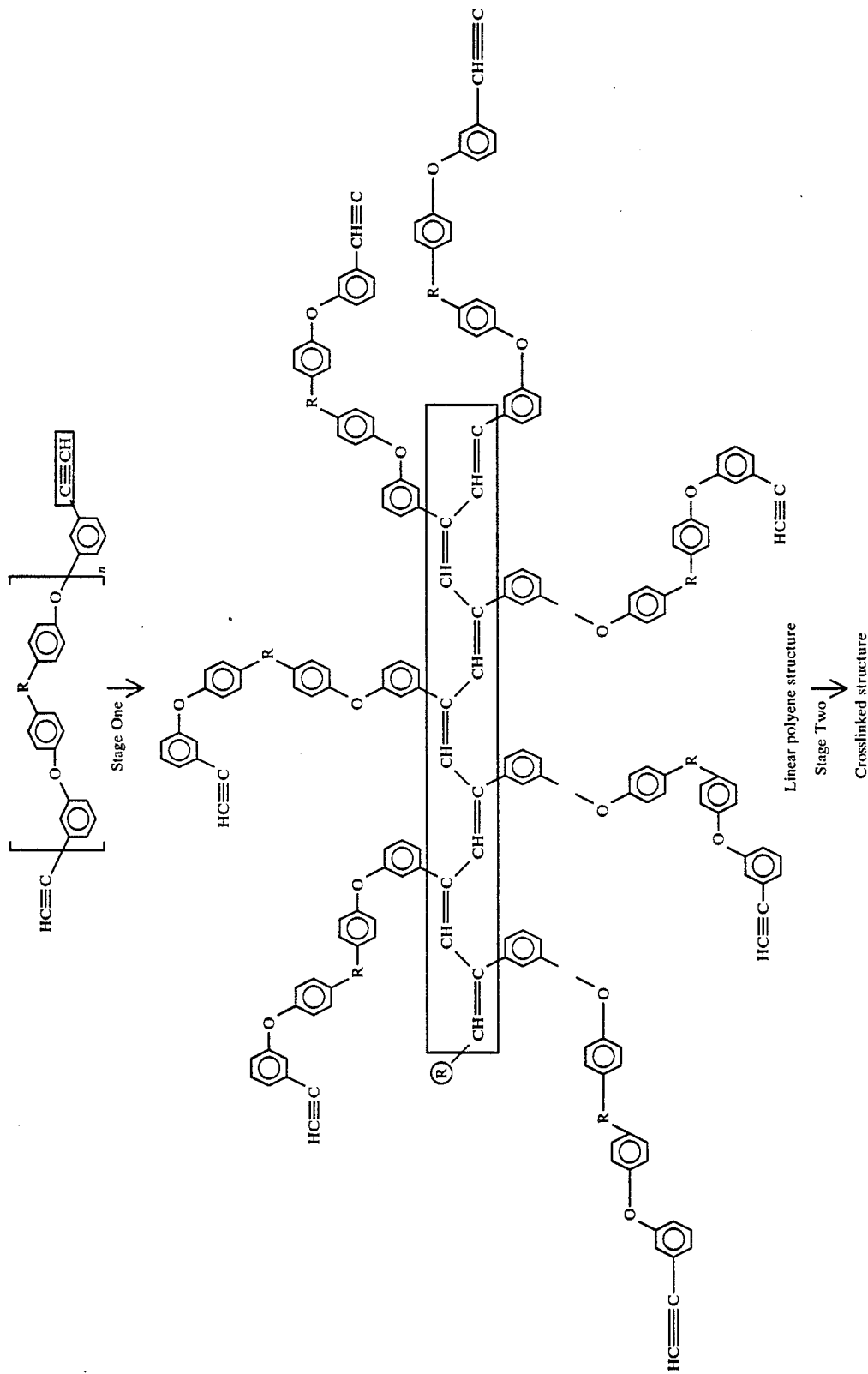

In stage one, the reaction site is an acetylene-terminated group, which is marked in the rectangular area at the top of the reaction equation. This reacting group is relatively sterically unhindered and is ready to react with another acetylene-terminated group of a different molecule. The addition reaction occurs very rapidly via a free radical mechanism. In a very short period of time, six to seven molecules are added to form a cluster, which has six to seven arms and a conjugated polyene moiety embedded in the center of the cluster. At this stage, the material is in the solid state. The reaction essentially stops until a higher curing temperature is applied.

The fast reaction rate of the stage one reaction is responsible for the narrow processing window of an acetylene-terminated oligomer. This entraps any residual solvent and air. As a result, the cured neat resin, composite, and adhesive joint contain voids and cracks which result in poor mechanical performance.

Another important factor contributing to the poor mechanical performance, particularly elevated temperature mechanical properties, is a lack of high degree of crosslinking. The crosslinking reaction occurs in stage two. The reacting group is the conjugated polyene marked in the rectangular area in the middle of the reaction scheme. Since this reaction site is buried in the center of a cluster, it is extremely difficult sterically for the polyene to interact with another molecule of the polyene. Consequently, a very high processing temperature is required to effect the crosslinking reaction.

The novelty of the present invention lies in the concept that if stage one of the reaction is slowed down and stage two is accelerated, a well-consolidated composite will result. The semi-IPN reaction system of the present invention is designed to exploit this concept.

An object of the present invention is to prepare a tough, processable semi-IPN from a thermosetting and a thermoplastic polyimide. The semi-IPN reaction system is so designed to undergo chain extension below 300° C., whereby the flow and the reaction rate are decreased and the processing window is broadened and, upon heating above 300° C., the flow is increased and crosslinking occurs at a rate which allows for the formation of a void-free polymer network.

Another object of the present invention is to form an unconventional simultaneous semi-interpenetrating network from a thermoplastic monomer precursor solution and a thermosetting monomer precursor solution.

Another object of the present invention is to improve the processing of Thermid ® AL-600.

Another object of the present invention is to improve the processing of NR-150B2.

Another object of the present invention is to prepare molding compounds, adhesives, and polymer matrix composites from the semi-interpenetrating network.

SUMMARY OF THE INVENTION

A high temperature semi-interpenetrating polymer network (semi-IPN) was developed which had significantly improved processability, damage tolerance, and mechanical performance, when compared to the unmodified acetylene-endcapped polyimides known commercially as Thermid ®. The improved processability is attributed in part to the broadening of the processing window and enhanced resin flow at the critical processing temperatures above 300° C. This was accomplished by a two step process. In the first step, the monomers slowly underwent linear chain extension below 300° C. This reaction was slow enough to allow the volatiles from the solvent and the reaction to escape, increasing the flow, and broadening the processing window. In the second step, the resins were heated above 300° C., causing an increase in molecular mobility and flow which allows for the formation of a composite having improved damage tolerance and mechanical properties. For example, the fracture energy for the semi-IPN was 603 j/m$^2$ as compared to 93 j/m$^2$ for Thermid ® LR-600.

The simultaneous semi-IPN was prepared using a non-conventional synthetic method where the monomer precursors of a thermoset were mixed with the monomer precursors of a thermoplastic and allowed to randomly react upon heating. In the present invention, the thermosetting polyimide monomer solution was Thermid ® AL-600, which is commercially available from the National Starch and Chemical Corporation. The thermoplastic polyimide monomer precursor solution is commercially available from E.I. Dupont de Nemours and Company (Dupont) under the name NR-150B2.

These semi-IPNs are useful as molding compounds, adhesives, and polymer matrix composites for the electronics and aerospace industries.

DESCRIPTION OF THE PREFERRED EMBODIMENTS

Figure 1:
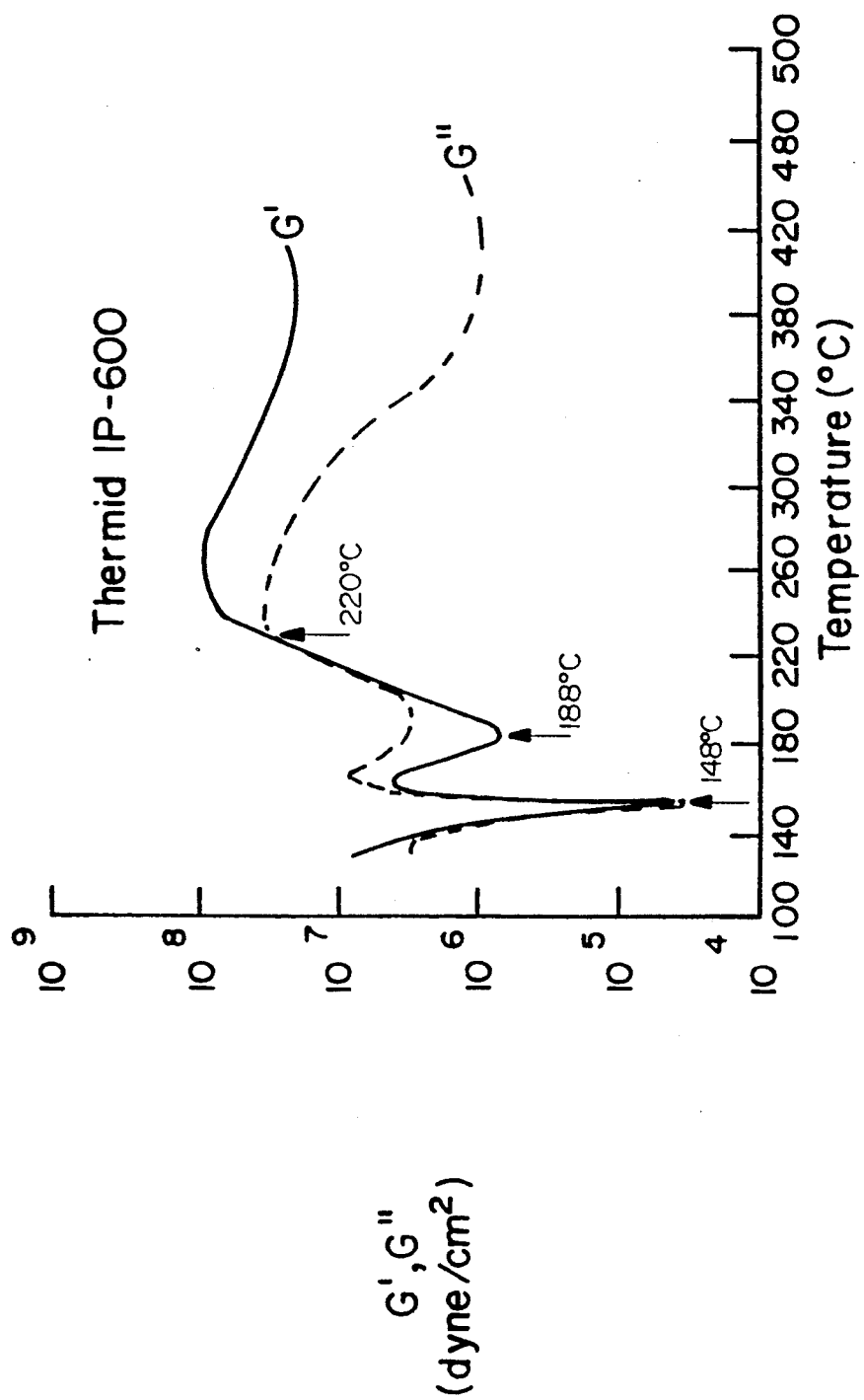
FIG. 1 shows storage modulus (G') and loss modulus (G'') temperature curves for the commercially obtained Thermid ® IP-600 as conducted by the inventor for illustrative purposes.

In high performance semi-IPN synthesis, one or more easy-to-process, but brittle thermosetting polyimides are combined with one or more tough, but difficult-to-process linear thermoplastic polyimides to form a semi-IPN polyimide which has a combination of several desirable properties. These properties include easy processability, damage tolerance, good mechanical performance, and good thermo-oxidative stability. This is achieved by controlling factors such as: (1) selection of constituent polymer components; (2) composition variation of the constituent materials; and (3) processing parameters.

The selection of the constituent thermosetting and thermoplastic polyimides is based primarily on their processing and property compatibility. Of particular importance are solubility in a common organic solvent and compatible cure cycles. In addition, these polymers must have comparable glass transition temperatures (Tgs) of ±50° C. coupled with similar mechanical performance and thermo-oxidative stability. These qualifications are met in the present invention.

The thermosetting polyimide, Thermid ® AL-600, is a solution containing the following monomeric precursors:

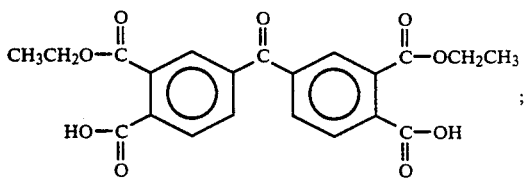

BTDE

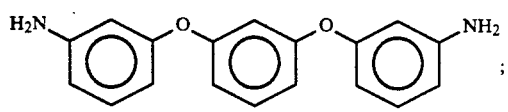

APB and

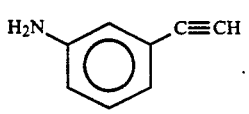

APA

In this solution, 2 moles of BTDE are combined with 1 mole of APB and 2 moles of APA. These precursors form an acetylene-terminated oligomer which then crosslinks to give a highly crosslinked polyimide when heated.

The thermoplastic polyimide portion of the semi-IPN was prepared from a monomeric mixture of the following three compounds:

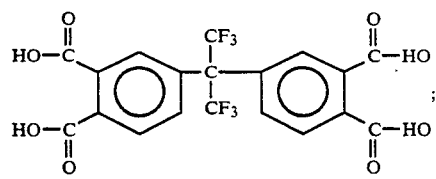

6FTA

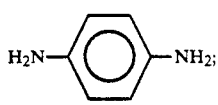

PPD and

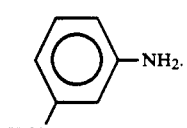

MPD

This polyimide precursor solution in N-methyl pyrrolidinone (NMP) is commercially available from Dupont under the name NR-150B2. In this solution, 6FTA is present in a stoichiometric quantity with respect to the total of PPD and PMD. The molar ratio of PPD to MPD is about 95:5. Although this mixture exists in NMP, there are other polyimide precursor solutions available from Dupont which are in ethanol. These systems are marketed under the trademarks NR-150B2 S2X to NR-150B2 S10X. When polymerized, this thermoplastic polyimide contains the following repeat unit:

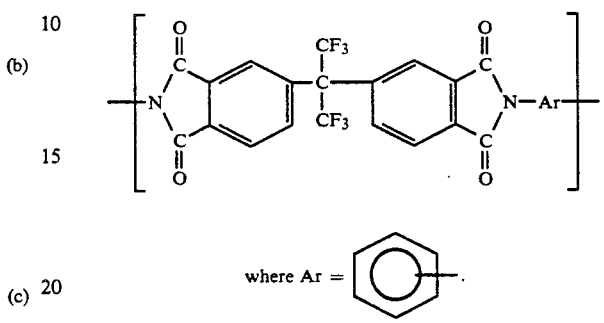

The composition of these materials significantly affects many aspects of the processing, properties, and morphology of the semi-IPN. For example, by increasing the concentration of the thermosetting component, there is an increase in the processability and performance of the semi-IPN but a decrease in the toughness characteristics. Although the weight ratio of the thermoset to the thermoplastic can be varied from 95:5 to 5:95, the ratio between 80:20 and 20:80 is preferred. The ratio of 80:20 gave the best overall balance of processing, performance, and cost effectiveness.

The semi-IPN of the present invention exhibits significantly improved processability over the prior art. The curing reaction of the prior art involves two steps or stages. In the first stage, there is a very rapid free-radical initiated addition reaction through the acetylene-terminated group leading to a linear polyene structure. This reaction takes place at a relatively low temperature (200° to 250° C.). The second stage involves a very slow crosslinking reaction of the conjugated double bond in the polyene to yield a highly crosslinked structure. This reaction occurs at a very high temperature (e.g. 371° C.). The present invention designed a reaction system to achieve that the reaction rate for the first stage was decreased and the second stage was accelerated. A retarded stage one reaction broadens the processing window and allows the volatiles to escape. Also, increasing the rate of stage two increases the degree of crossslinking and, thus, improves the elevated temperature mechanical properties.

These objectives were achieved through a change in the flow properties of the prior art. This was made possible by the presence of a thermoplastic component, that exhibited poor flow in the low temperature region and good flow in the high temperature range. Thus, its presence decreases the flow, slows down the reaction rate and broadens the processing window of the prior art, during the low temperature curing stage. Also, in the high temperature region, its presence increases the flow, molecular mobilities and rate of the crosslinking reaction. This provides a high temperature system having both improved processability and thermal mechanical performance, compared to the unmodified prior art. Furthermore, if the thermoplastic used has good toughness, its presence also enhances the toughness related properties, including fracture toughness, impact resistance, and microcrack resistance.

Figure 2:
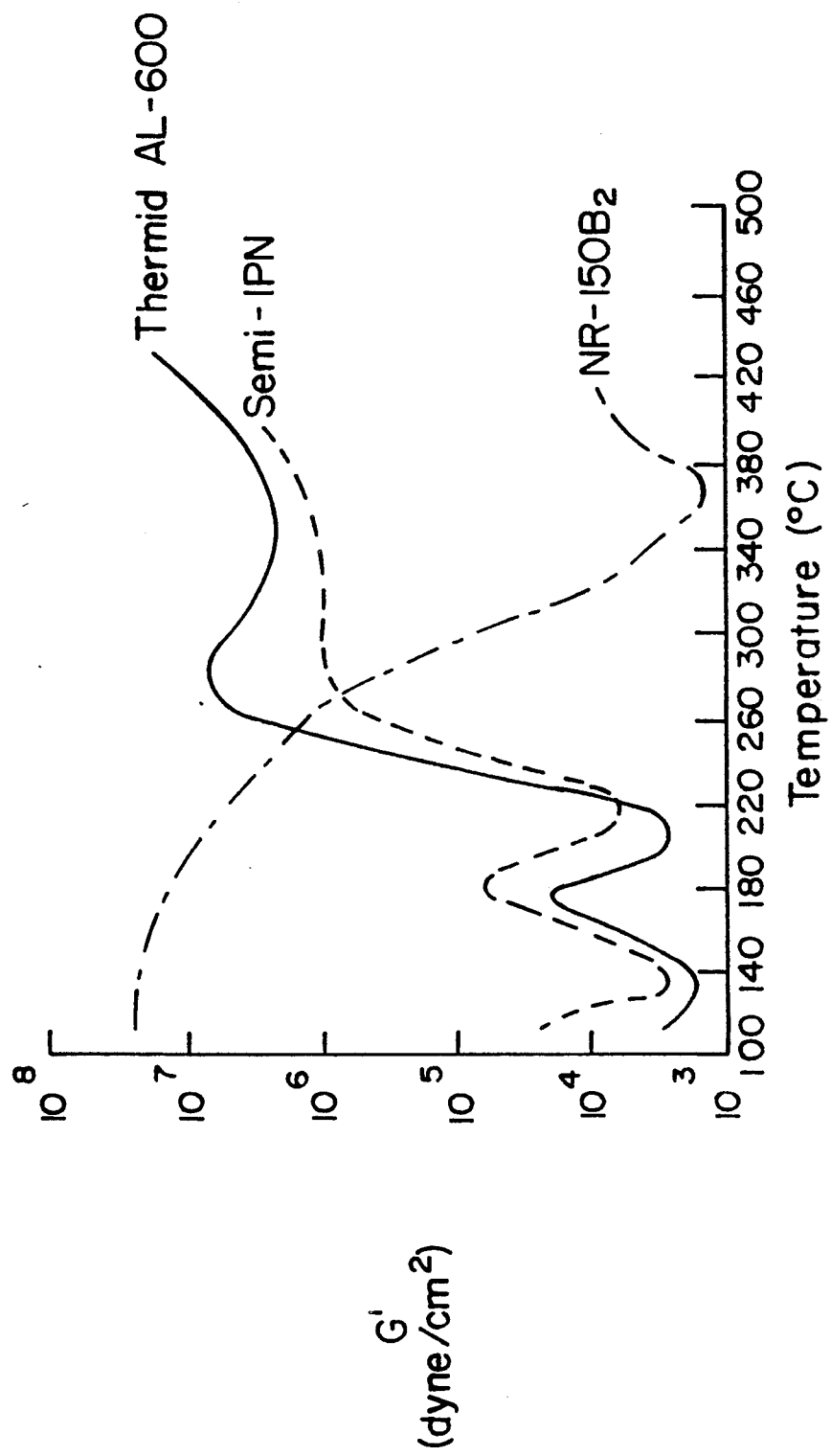
FIG. 2 shows storage modulus (G') temperature curves for the semi-IPN of the present invention and its constituent materials, Thermid ® AL-600 and NR-150B2.
Figure 3:
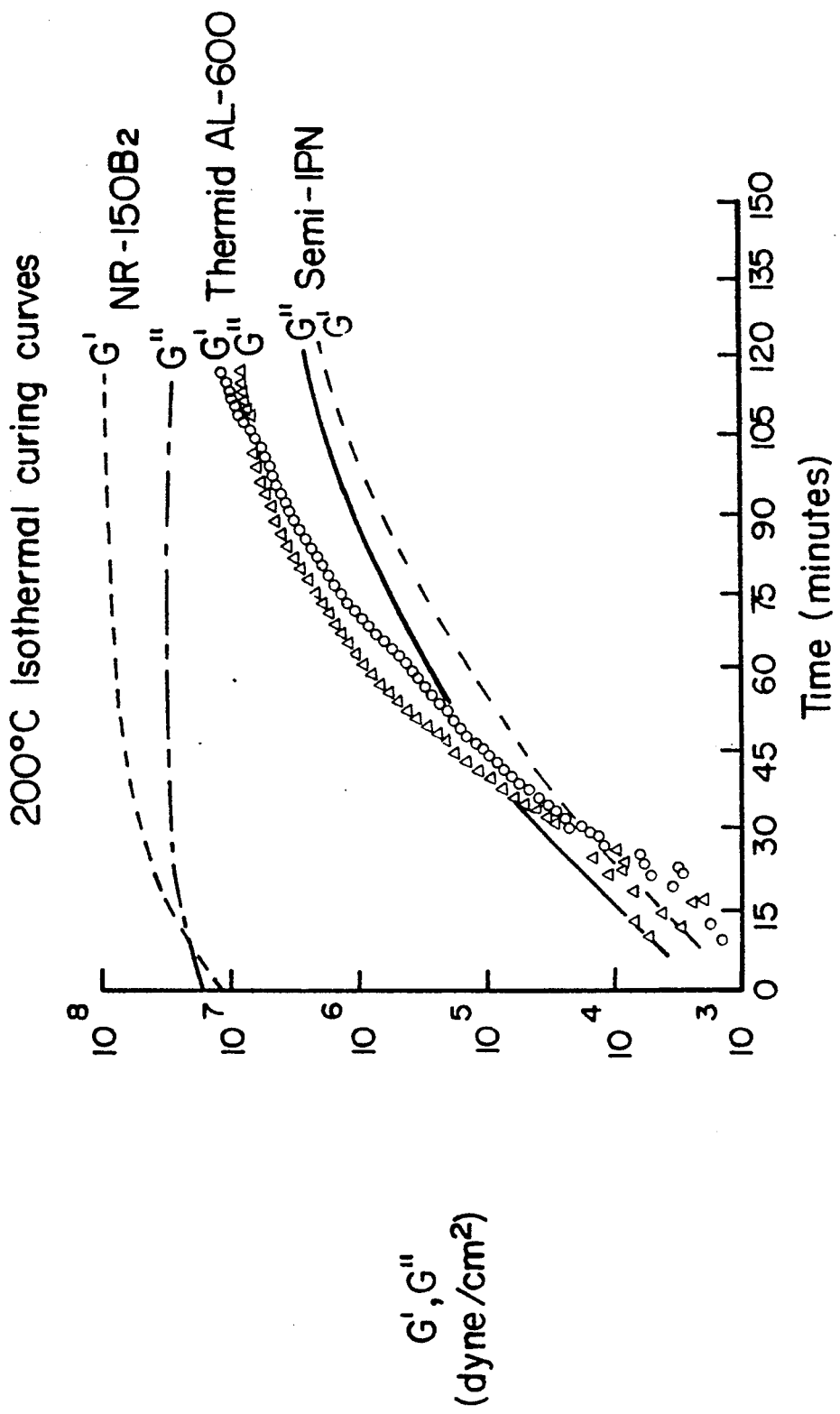
FIG. 3 shows 200° C. isothermal curing curves for the same materials as used for FIG. 2.

To illustrate how the presence of a thermoplastic component alters the rheological properties of the prior art, FIG. 2 shows the rheological properties of a semi-IPN prepared from a Thermid ® AL-600 and NR-150B2 monomeric precursor solution. The sample preparations and rheological characterization are detailed in the examples. For a meaningful comparison of the rheological properties, the constituent materials were also prepared and characterized along with the semi-IPN sample under an identical condition. Their rheological properties are also shown in FIG. 2. Thermid ® AL-600 had two large transition peaks at 140° C. and 210° C., respectively. As a result, this material exhibited excessive flow in the low temperature region (140°-200° C.). The opposite is true for the NR-150B2 material. This material did not melt and its viscoelasticity behaved like a solid. FIG. 3 shows the 200° C. isothermal curing curve for this material.

Figure 4:
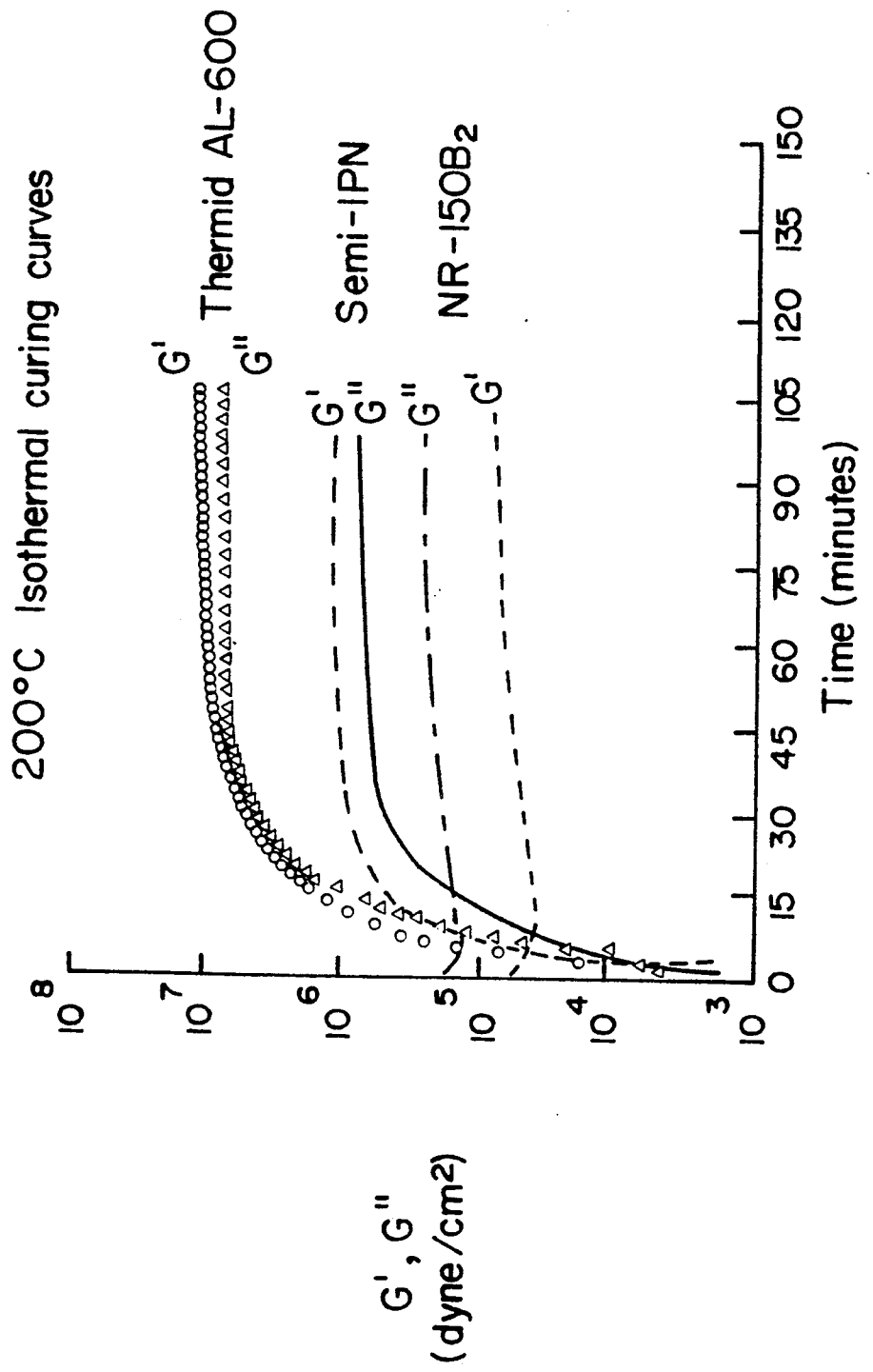
FIG. 4 shows 250° C. isothermal curing curves for the same materials as used for FIG. 2.

Interestingly, when the cure temperature was raised above 200° C., the NR-150B2 began to flow rapidly and stayed in a fluid state throughout the rheological measurements for up to 430° C. (see FIG. 4). Conversely, the Thermid ® AL-600 material rapidly gelled (gel temperature 220° C.) and became a rigid solid at temperatures above 260° C. This behavior is also seen in the 250° C. isothermal curing curve shown in FIG. 4. There was a dramatic increase in moduli (three to four orders of magnitude) just within 1 0 minutes at 250° C.

In the semi-IPN, the presence of the NR-150B2 material decreased the flow of the Thermid ® AL-600 in the temperature range of 140° C. to 200° C. This provided synergistic flow properties for the semi-IPN. In the higher temperature region (200° C.-400° C.), the presence of the NR-150B2 material increased the flow of the Thermid ® AL-600 (see FIGS. 2 and 4). The increased flow at 250° C. and 316° C., which were the cure temperatures used in the present invention, is particularly important. As a result, the improved processability has provided high quality composites. This is demonstrated in the examples. The composite property values obtained in this invention were significantly higher than those reported by the National Starch and Chemical Corporation and Landis, as mentioned previously. A unidirectional flexural strength of 279 ksi and interlaminar shear strength of 20.7 ksi were obtained for the semi-IPN matrix resin of the present invention when tested at room temperature. In fact, these values mark the first time a high level of composite mechanical properties have been reported in the open literature for the Thermid ®-based materials. This is remarkable in view of the fact that these materials have been under experimental and developmental evaluation and modification for the past 20 years.

In the present invention, the simultaneous synthetic method is preferred, because it offers easier processing, better performance, and less phase separation, as compared to the sequential approach. In the conventional method, an uncrosslinked preimidized oligomer is crosslinked with a monomer precursor of NR-150B2. The constituent thermosetting and thermoplastic polymers are formed independently without any chemical interference between the precursors of the two polymer components.

The synthetic method employed in making the present semi-IPN was non-conventional. This method involved mixing the monomers of the thermosetting component with the monomers of the thermoplastic component and allowing them to react randomly to form a simultaneous semi-IPN. There is an inter-reaction between the monomers of the thermoset and the thermoplastic which results in a semi-IPN which is significantly different in chemical structure and properties from those prepared by conventional methods. The reaction is illustrated by the following scheme.

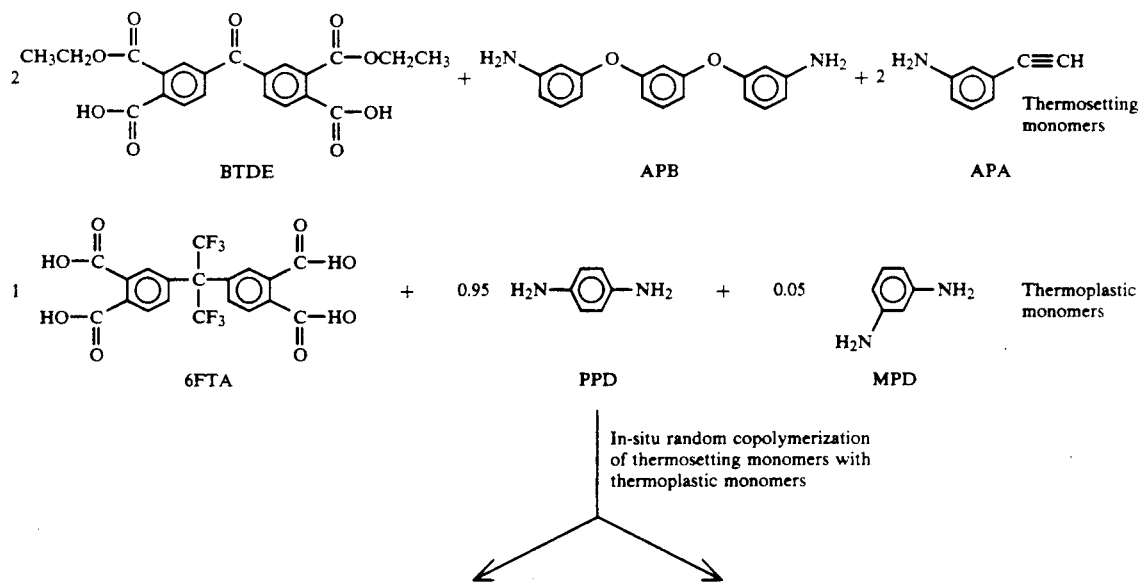

A mixture of linear polyamic acids ↓ A mixture of linear polyimides
A mixture of acetylene-terminated amic acid oligomers ↓ A mixture of acetylene-terminated imide oligomers ↓ $+C=C-C=C+_n$ a mixture of polyenes ↓ A mixture of crosslinked polyimides
Some of the products formed have the chemical structures shown below:
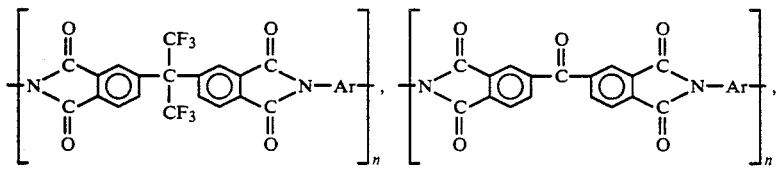
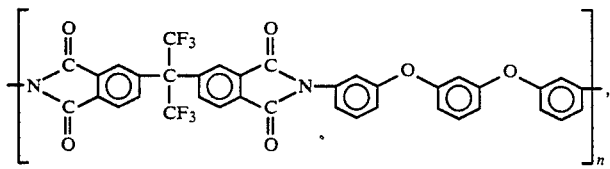
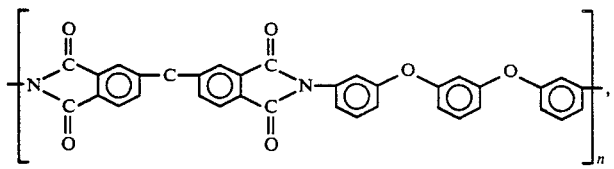
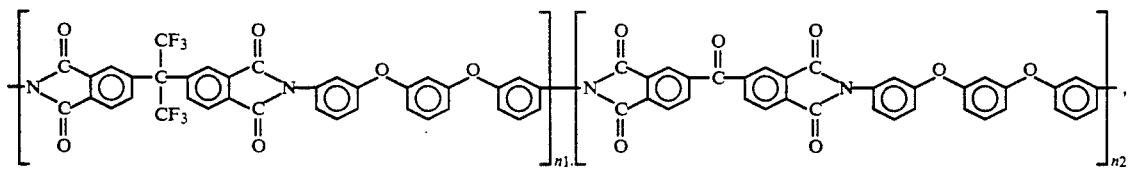
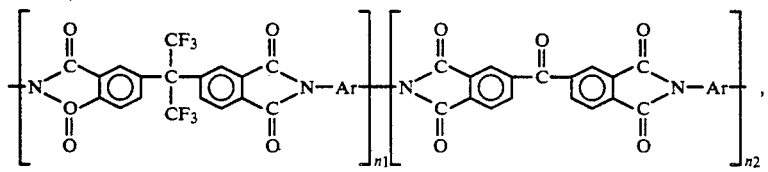
wherein Ar =  or 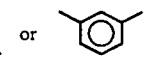
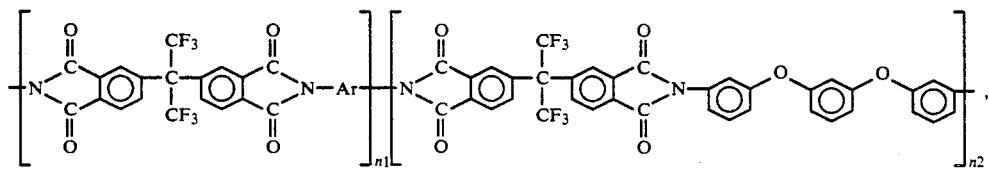

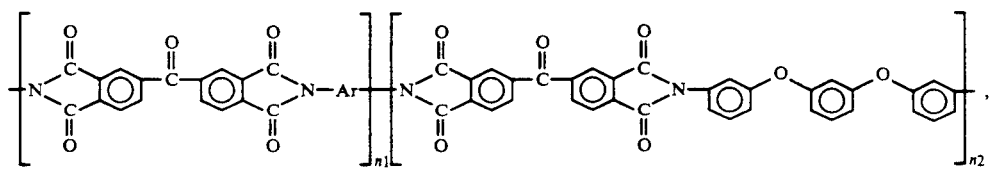

and other linear polyimides.

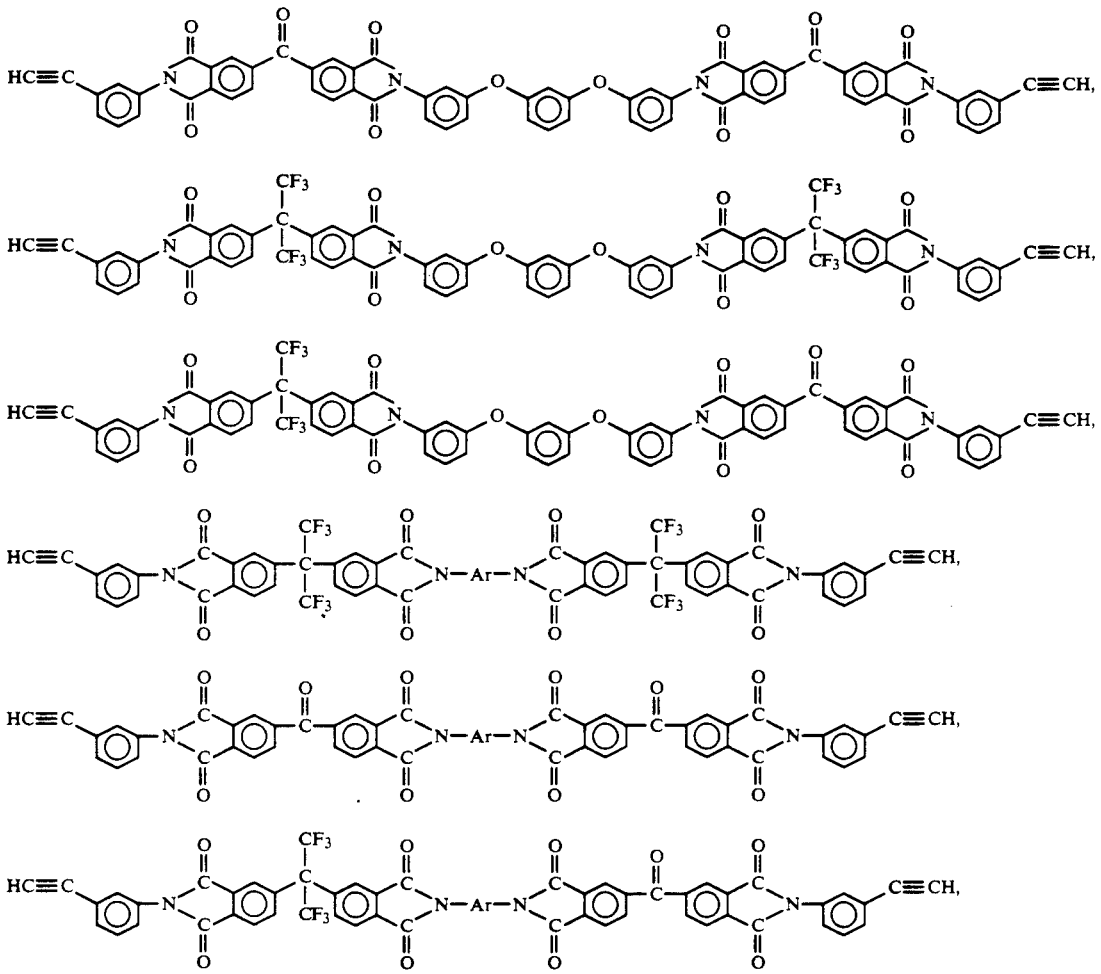

and other acetylene-terminated imide oligomers.

The non-conventional synthetic method is very attractive because it uses low viscosity, low molecular weight starting materials. These starting materials are soluble in a low-boiling solvent. The use of a low-boiling solvent enables ease of solvent removal during the product manufacturing.

The semi-IPN polyimide of this invention is useful as a composite matrix and as an adhesive and molding compound for long-term applications in the range from 200° C. to 316° C. as in aerospace structural components and especially in electronic technologies.

The following are examples which illustrate the preparation and use of semi-IPNs for applications such as advanced composites, structural adhesives, and molding articles. These examples are merely illustrative and intended to enable those skilled in the art to practice the invention in all of the embodiments flowing therefrom, and do not in any way limit the scope of the invention as defined in the claims.

EXAMPLES

Example 1

Rheological Characterization

The following is the procedure used to determine the rheological properties of the semi-IPN systems and their constituent materials. A sample powder was prepared by precipitation into water in a high speed blender. The solids were collected, washed with water, and dried at room temperature for one week. No heat treatment was given to the dried powder prior to the rheological measurements. This was done to study their thermal transitions in the low temperature region. For solid materials, such as Thermid ® IP-600, Thermid ® MC-600, and Thermid ® FA-700, the commercial products were used as received. Rheological measurements were performed on a Rheometrics ® System 4 rotary rheometer equipped with a parallel plate test fixture. A sample disc of 2.50 cm in diameter was prepared by molding approximately 0.7 g of material at room temperature under a pressure of 5,000 psi. The resulting sample disc was approximately 1.5 mm in thickness. The sample discs were always stored inside the decicator before use. During measurement, the plates and the test sample were enclosed in a heated chamber purged with dry nitrogen. In the isothermal experiment, the test chamber was always pre-warmed to the test temperature before loading the sample. In the dynamic experiment, the test chamber was prewarmed to 110° C., followed by temperature scans from 110° C. to 450° C. at a rate of 2° C./min. In both cases, the initial (first) measurement was taken after the sample was subjected to oscillatory shear under the initial test temperature for approximately three minutes. In addition to a dynamic run, isothermal measurements were also made at 135° C., 200° C., and 250° C., respectively.

A dynamic motor was used to drive the upper plate to oscillate continuously at a fixed frequency of 10 rad/sec. The bottom plate, which remained stationary during the measurement, was attached to a torque transducer which recorded forces. The strain (oscillatory amplitude) level was adjusted manually in accordance with the changing stiffness of the reactive resin system during measurement. The levels of strain were selected to assure that the measurements were performed within the material's linear viscoelastic response range and, at the same time, adequate torque values were generated without slippage. Each experiment was repeated at least twice to ensure its reproducability. The recorded cyclic torque values were separated into in-phase and out-of-phase components, and the corresponding storage (G') and loss (G") moduli and the tan δ values were calculated by the Rheometrics ® Data Acquisition and Analysis package.

Example 2

Preparation of semi-IPN of Thermid ® NR-150B2

This semi-IPN was prepared by the non-conventional synthetic method which was generally discussed supra.

To 138.6 g of a Thermid ® AL-600 monomeric precursor solution (75 weight percent solids in ethanol as supplied by the National Starch and Chemical Corporation) was added 42.6 g of an NR-150B2 monomeric precursor solution (61.1 weight percent solids in ethanol obtained from Dupont) and 38.0 g of anhydrous ethanol. The mixture was stirred at room temperature for one hour to yield a homogeneous, viscous dark black solution, which contained about 59 weight percent solids. The Thermid ® AL-600 and NR-150B2 monomeric precursors were present in approximately 80 and 20 weight percent, respectively.

Example 3

Neat Resin Preparation

To prepare a neat resin, the solution of Example 2 was concentrated at 100° C. under vacuum (30 inches Hg) for two hours and then staged at 200° C. for one hour in air to afford a black molding powder. About 15.00 g of this molding powder was compression molded at 250° C. for one hour and at 316° C. for another hour under 2500 psi pressure. The material was removed from the press when the mold temperature reached 177° C. This process yielded a neat resin which had a density of 1.32 g/cc and showed no detectable voids or defects by a visual inspection.

The as cured neat resin was used to prepare compact tension testing specimens for fracture energy evaluation. However, for the other test specimen preparations, the resin was post-cured at 316° C. for 16 hours in air. To make a meaningful comparison of the properties, the neat resins of Thermid ® LR-600 and NR-150B2 were also prepared and tested along with the semi-IPN material under identical conditions. There was one exception, in that the NR-150B2 neat resin had an additional curing at 350° C. for one-half hour in order to increase the molecular weight. Table 1 compares the physical and mechanical properties of these three neat resins.

TABLE 1

| | Neat Resin Properties | | |
|---|---|---|---|
| Property | Semi-IPN Thermid ® AL-600 and NR-150B2 | Thermid ® LR-600 | NR-150B2 |
| $^a$Glass Transition Temperature, °C. | 320 | 290 | 352 |
| $^b$Fracture Energy, $G_{1c}$, J/m$^2$ | 603 | 93 | 2555 |
| $^c$Temperature at 5% weight loss by TGA in Air | 490 | 460 | 515 |
| $^d$Moisture Absorption, % | — | 0.3 | 0.6 |

$^a$By TMA
$^b$Per ASTM E399
$^c$At a heating rate of 2.5° C./min
$^d$Two weeks in water at room temperature

Example 4

Composite Fabrication

For advanced composite applications, the resin solution from example 2 was used to prepare a prepreg tape by passing unsized Celion ® 6000 graphite fibers (available from BASF A.G.) through a dip tank and onto a 12-inch diameter multiple speed drum winder wrapped with release paper. This produced a wet prepreg (10 inches by 75 inches) having smooth, good tack, and drape characteristics by visual inspection. The tape was dried on the rotating drum at room temperature for ten hours, removed from the drum, cut into 3 inch by 6 inch plies and then staged at 150° C. for one-half hour in air. Twelve plies were stacked unidirectionally, placed in a cold matched metal die and then inserted into a press which was preheated to 250° C. A thermocouple was attached to the matched die to determine the temperature. When the die temperature reached 250° C., 500 psi pressure was applied. The composite was cured one hour at 250° C. and one hour at 316° C. under 500 psi pressure and then removed from the press, when the die temperature reached 177° C. The composite was post-cured at 316° C. in air for 16 hours. This resulted in a high quality composite, as no voids, cracks, or defects were detected by ultrasonic C-scan. The composite was then machined into various specimens for testing. For comparison purposes, Celion ® 6000 graphite fiber-reinforced composites were also fabricated from Thermid ® AL-600 and Thermid ® LR-600 and tested under the same conditions as the semi-IPN material. The unidirectional composite properties of the semi-IPN and the constituent materials are given in Table 2.

TABLE 2

| Property | Unidirectional Composite Properties | | | | |
|---|---|---|---|---|---|
| | Semi-IPN[d] Thermid ® AL-600 and NR-150B2 | Thermid ® Al-600[d] | Thermid ® LR-600[d] | Thermid ® MC-600[f] | Thermid ® IP-600[g] |
| [a]Glass Transition Temperature, °C. | 290 and 330 | — | — | — | — |
| Density, g/cm$^3$ | 1.58 | 1.50 | 1.50 | — | — |
| [b]Flexural Strength, Ksi | | | | | |
| 25° C. | 279 | — | — | 195 | 130 |
| 232° C. | 206 | — | — | 148[e] | 78[h] |
| [b]Flexural Modulus, Msi | | | | | |
| 25° C. | 15.0 | — | — | 15.0 | — |
| 232° C. | 14.5 | — | — | 12.0[e] | — |
| [c]Interlaminar Shear Strength, Ksi | | | | | |
| 25° C. | 20.7 | 9.6 | 9.6 | 12.1 | 7.3 |
| 232° C. | 14.0 | 4.5[e] | — | 8.0[e] | 5.0[h] |

[a]By TMA
[b]Per ASTM D790
[c]Per ASTM D2344
[d]Reinforced with Celion ® 6000 graphite fibers
[e]Tested at 316° C.
[f]Reported by the National Starch and Chemical Corporation Product Data Sheet number 26283, reinforced with Hercules HTS ® graphite fibers, postcured for 4 hours at 343° C., and then 4 hours at 371° C.
[g]Reported by Landis and Naselow NASA Conference Publication 2385 (1983)
[h]Tested at 288° C.

What is claimed as new and desired to be secured by Letters Patent of the United States is:

1. A non-conventional synthetic method for preparing a tough, processable semi-interpenetrating polymer network, comprising:
   (a) mixing monomer precursors of a thermosetting polyimide wherein one monomer precursor contains an acetylene end group acting as a crosslinking site and monomer precursors of a thermoplastic polyimide at a weight ratio from about 95:5 to 5:95;
   (b) allowing the monomer precursors of the thermosetting polyimide to react randomly with the monomer precursors of the thermoplastic polyimide to undergo linear chain extension below 300° C., whereby flow and reaction rate of the monomer precursors of the thermosetting polyimide are decreased by the presence of the monomer precursors of the thermoplastic polyimide and a mixture containing at least one compound containing a polyene structure and at least one thermoplastic polyimide is formed; and
   (c) heating the mixture above 30° C., whereby flow and crosslinking reaction rate of the polyene structure are increased by the presence of the thermoplastic polyimide forming a tough, processable semi-interpenetrating polymer network.

2. The non-conventional synthetic method for preparing a tough, processable semi-interpenetrating polymer network of claim 10, wherein the monomer precursors of the thermosetting polyimide comprise a mixture of the following three compounds:

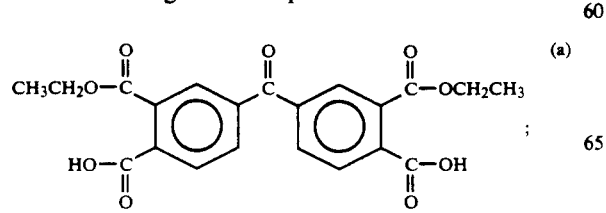

(a)

-continued

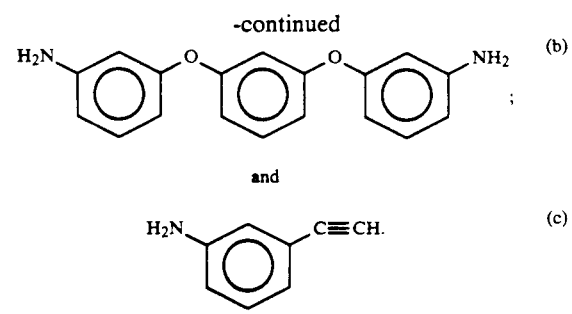

3. The non-conventional synthetic method for preparing a tough, processable semi-interpenetrating polymer network of claim 1, wherein the monomer precursors of the thermoplastic polyimide comprise a mixture of the following three compounds:

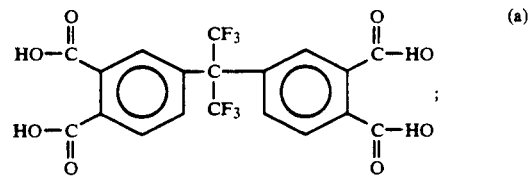

(a)

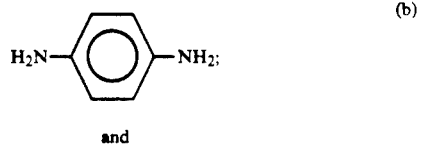

(b)

and

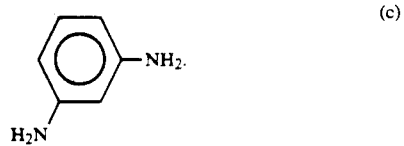

(c)

4. The non-conventional synthetic method for preparing a tough, processable semi-interpenetrating polymer network of claim 3, wherein compound is present in a stoichiometric quantity with respect to the total of compound (b) and compound (c), and the molar ratio of compound (b): compound (c) is about 95:5.

5. The non-conventional synthetic method for preparing a tough, processable semi-interpenetrating polymer network of claim 1, wherein the monomer precursors of the thermosetting polyimide and the monomer precursors of the thermoplastic polyimide are present in a weight ratio from about 80:20 to 20:80.

6. The non-conventional synthetic method for preparing a tough, processable semi-interpenetrating polymer network of claim 5, wherein the weight ratio of the monomer precursors of the thermosetting polyimide to the monomer precursors of the thermoplastic polyimide is 80:20.

7. The tough, processable semi-interpenetrating polymer network prepared by the method of claim 1.

8. A molding compound comprising the semi-interpenetrating polymer network of claim 7.

9. An adhesive comprising the semi-interpenetrating polymer network of claim 7.

10. A polymer matrix composite comprising the semi-interpenetrating polymer network of claim 3.

* * * * *